(12) United States Patent
Niu et al.

(10) Patent No.: US 10,780,401 B2
(45) Date of Patent: Sep. 22, 2020

(54) HIGHLY SELECTIVE ALICYCLIC POLYAMIDE NANOFILTRATION MEMBRANE AND MAKING METHOD THEREOF

(71) Applicant: China University of Petroleum (East China), Qingdao (CN)

(72) Inventors: Qingshan Jason Niu, Qingdao (CN); Bingbing Yuan, Qingdao (CN); Tao Yuan, Qingdao (CN); Peng Li, Qingdao (CN); Haixiang Sun, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 123 days.

(21) Appl. No.: 16/033,413

(22) Filed: Jul. 12, 2018

(65) Prior Publication Data
US 2018/0326362 A1    Nov. 15, 2018

Related U.S. Application Data

(63) Continuation-in-part of application No. PCT/CN2017/079628, filed on Apr. 6, 2017.

(30) Foreign Application Priority Data

Mar. 6, 2017  (CN) .......................... 2017 1 0127595

(51) Int. Cl.
*B01D 67/00* (2006.01)
*B01D 69/12* (2006.01)
(Continued)

(52) U.S. Cl.
CPC ......... *B01D 67/0088* (2013.01); *B01D 69/12* (2013.01); *B01D 69/125* (2013.01);
(Continued)

(58) Field of Classification Search
None
See application file for complete search history.

(56) References Cited

U.S. PATENT DOCUMENTS 6,464,873 B1    10/2002    Tomaschke
6,723,422 B1 *   4/2004    Hirose .................. B01D 69/02
                                                        428/319.3
(Continued)

FOREIGN PATENT DOCUMENTS

CN    101870772 A    10/2010
CN    105080367 A    11/2015

*Primary Examiner* — Krishnan S Menon
(74) *Attorney, Agent, or Firm* — Bayramoglu Law Offices LLC

(57) ABSTRACT

The present invention discloses a highly selective alicyclic polyamide nanofiltration membrane and a making method thereof. The method comprises the following steps: alternately and uniformly coating at least an alicyclic acid chloride solution and at least an alicyclic amine solution on a porous support membrane, using a spin coating method or a soaking method, to form at least one layer of the alicyclic polyamide nanofiltration membrane. Preferred embodiments exhibit improved ion selectivity, e.g. increased water flux, enhanced divalent/monovalent rejection selectivity, reduced fouling and improved divalent rejection rate ($Ca^{2+}$, $Mg^{2+}$) compared to the traditional aromatic-alicyclic mixed-structure polyamide nanofiltration membrane and/or the whole aromatic polyamide nanofiltration membrane. Therefore, the alicyclic polyamide nanofiltration membranes made in the present invention has great application prospect in the fields of zero-liquid discharge of industrial wastewater, water softening, and produce water treatment, etc.

11 Claims, 2 Drawing Sheets

(51) Int. Cl.
    *B01D 71/56*     (2006.01)
    *B01D 71/60*     (2006.01)
    *C02F 1/44*     (2006.01)
    *B82Y 30/00*     (2011.01)
    *B01D 61/02*     (2006.01)

(52) U.S. Cl.
    CPC ............ *B01D 71/56* (2013.01); *B01D 71/60* (2013.01); *C02F 1/442* (2013.01); *B01D 61/027* (2013.01); *B01D 67/0006* (2013.01); *B82Y 30/00* (2013.01)

(56) References Cited

U.S. PATENT DOCUMENTS

| | | | |
|---|---|---|---|
| 8,445,076 B2 * | 5/2013 | Cohen | B01D 65/08 427/569 |
| 10,040,032 B2 * | 8/2018 | Zhang | B01D 69/02 |
| 2016/0129401 A1 * | 5/2016 | Furuno | B01D 69/10 210/483 |

* cited by examiner

HIGHLY SELECTIVE ALICYCLIC POLYAMIDE NANOFILTRATION MEMBRANE AND MAKING METHOD THEREOF

CROSS REFERENCE TO RELATED APPLICATIONS

This application is the Continuation-in-part of International Application No. PCT/CN2017/079628, filed on Apr. 6, 2017, which is based upon and claims priority to Chinese Application No. 2017101275950, filed on Mar. 6, 2017, the entire contents of which are incorporated herein by reference.

TECHNICAL FIELD

The present invention relates to the field of membrane based separation technology in water treatment industries, specially relates to a highly selective alicyclic polyamide nanofiltration membrane and making method thereof. The said highly selective and permeable nanofiltration membrane could be used for the treatment of feed streams such as surface water, industrial wastewater, dyeing wastewater, drinking water and dairy industry. These streams contain dissolved substances with different size and/or charge, particularly to such processes in which:

For the surface water system, water hardness due to dissolved Ca and Mg salts could add the inconvenience for their usage and operation, Nanofiltration membrane can remove most of Ca, Mg and other divalent ions, and simultaneously permeate monovalent ion such as sodium potassium chloride.

In the zero liquid discharge (ZLD) wastewater treatment process, typically for industries such as salt chemical, chlor-alkali chemical, coal chemical hydrometallurgy, and pharmaceutical industries wastewater containing both sodium chloride and sodium sulfate components will be encountered, and the nanofiltration membrane could substantially retain sodium sulfate and allow sodium chloride to permeate.

For the waste streams generated during textile dying process, both dyes and salts are present commonly, nanofiltration membrane could be used to keep the valuable salts while concentrating dyes into a more manageable volume.

In drinking water supply system, the raw water may contain dissolving and/or dispersing bacteria, assimilable Organic Carbon (AOC), volatile organic compounds (VOCs), phthalate esters (PAEs), endocrine disruptors (EDCs), Natural (NOM) and/or Dissolved Organics (DOC) such as atrazine and/or simazine, and other trace organic pollutants (i.e. having molecular weights greater than about 300 Daltons), nanofiltration membrane could be used to remove these impurities and selectively keep substances that are beneficial in drinking water.

In the dairy industry, nanofiltration membrane could be used to demineralize whey products by passing undesirable monovalent salts (Na, K, and Cl) and simultaneously concentrating constituents such as lactose, protein, and calcium.

By way of examples without limitation:

Surface water may be separated with a variety of such nanofiltration membranes into a permeate containing primarily water and sodium and potassium chlorides (and other monovalent salt) and a retentate side containing multivalent salt in which one of the ionic moieties thereof has two or more electric charges;

Industrial wastewater containing sodium sulfate and sodium chloride may be separated into a permeate containing primarily water and sodium chloride and a retentate containing sodium sulfate;

Textile printing and dyeing wastewater may be separated into a permeate containing primarily water and sodium chloride and a retentate containing valuable dyes;

Drinking water may be separated with a permeate containing primarily water and a retentate containing low molecular organics generally having molecular weights in excess of about 300 Daltons.

Using the novel, alicyclic polyamide thin film composite nanofiltration membranes disclosed herein, the above mentioned and other separations can be carried out with substantially separation precision and size screening effect as well as high water fluxes compared to that experienced with commercial available membranes.

BACKGROUND

Membrane separation technology solves the growing problem of clean water supply issues in the world, with the advantages of less raw materials and energy consumption, small foot print and free of pollution. Commonly used water treatment membranes are divided into microfiltration membrane; ultrafiltration membrane; nanofiltration membrane and reverse osmose membrane. Within nanofiltration membrane could be divided into two categories: a class of pressured driven membrane with high selectiveness (high monovalent/divalent selectivity), referring to as a highly selective nanofiltration membrane; and a water softening nanofiltration membrane commonly used for removing calcium and magnesium. With its high Ca and Mg removal rates, the latter is also known as "loose" reverse osmose membrane.

The highly selective nanofiltration membrane normally has a rejection with molecular weight cut-off of 200-300 dalton and a pore diameter of 0.1-2 nm, thus, it is widely used in the zero-liquid discharge process such as coal chemical plant and power plant wastewater treatment, dyeing industry, food processing and medicine manufacture wastewater treatment and wastewater recycling areas to selectively remove the molecules and ions according to such sieve effect.

In recent years, the technology of salt separation in zero-liquid discharge process has put forward higher requirements on the performance of nanofiltration membranes. Membranes with defined pore size distribution, controlled thickness of the morphology, high desalination selectivity, and high throughput have become a new direction of invention. As commonly known, the existing commercial "loose" reverse osmose membrane is prepared by interfacial polymerization of TMC (trimesoyl chloride) and MPD (metaphenylene diamine). Though having high Ca and Mg removal rates, the roughness of this membrane is often high, in the range of 40-200 nm, which results poor anti-fouling performance. Therefore, improving the membrane fabrication technology, and exploring new interfacial polymerization monomers to prepare next generation of nanofiltration membranes becomes even more important.

At present, highly selective nanofiltration membranes are based on the classical interfacial polymerization of TMC and anhydrous piperazine (PIP) monomers, and have an aromatic and alicyclic mixed structure. Not bonding to a standard, the specific preparation steps are as following: firstly, soaking a porous support in an aqueous phase amine solution, removing the extra aqueous amine phase or solution on the surface of the porous support by gas purging or roller-push sweeping, and then immersing the porous support in the organic acid chloride solution for enough reaction time, taking out the porous support to obtain a nanofiltration membrane with a thickness of 20-200 nm.

Although above conventional interfacial polymerization process can produce nanofiltration membranes with excellent desalination performance, it may not easily control the kinetics of the interfacial polymerization, which influences the external morphology (thickness, roughness, surface functionality) and the internal structure (chemical composition, molecular topology, molecular uniformity) of the membranes, and subsequently, have an effect on the membrane performance such as water flux, salt rejection, and selectivity of water and salt. During the removal of extra raw materials, roller-push sweeping or gas purging is usually used in the conventional interfacial polymerization process to remove the residual aqueous phase monomers and organic monomers. The distribution of the aqueous phase monomers and organic monomers on the ultrafiltration membrane surface or inside the surface pore could be far from uniform due to the instantaneous characteristics of polymerization reaction. Thus the interfacial polymerization could be carried out in an uncontrollable manner (monomer diffusion-reaction mechanism), and therefore the morphology and thickness of the membranes are not uniform, which affects the desalination performance of the nanofiltration membranes.

Nanofiltration membranes prepared by TMC and PIP monomers normally shows a certain degree of monovalent salts rejection. For example, the rejection rate of NaCl is often more than 40% while $Na_2SO_4$, rejection rate is greater than 95%, thus multivalent salts and monovalent salts cannot be separated completely. As a reference, during the preparation of micro-mesoporous materials such as metal-organic framework materials (MOFs), covalent organic framework materials (COFs), porous organic cages (POCs) and polymers with intrinsic microporosity, nanoporous materials are usually formed by designed monomers with a unique configuration through covalent bond or coordinate covalent bond, producing a unique molecular sieve separation effect on a nanoscale. In contrast, the nanoporous membrane formed by existing monomers such as trimesoyl chloride (TMC) and piperazine (PIP) here through interfacial polymerization cannot achieve the high selectivity of monovalent salts and divalent salts due to the monomer structure and reactivity heterogeneity. Therefore, their fluxes are low, and the salt rejection selectivity is poor.

SUMMARY

The objective of the present invention is to provide a highly selective alicyclic polyamide nanofiltration membrane and making method thereof, so as to solve the problems such as inconsistent membrane structure and morphology, low flux, poor selectivity, and poor anti-fouling properties, etc. which are associated with the process of making existing nanofiltration membrane.

In order to solve the above problems, this invention includes the steps of:

Alternately and uniformly coating at least an alicyclic acid chloride solution and at least an alicyclic amine solution on a porous support membrane using a spin coating method or a soaking method for interfacial polymerization, cycling in turn, to form at least one layer of the alicyclic polyamide nanofiltration membrane. For multi-layer membrane, the alicyclic acid chloride solution and the alicyclic amine solution may be alternately coated for several times. Not bond to full cycling; the last spin-coating solution may be the alicyclic acid chloride monomer solution or the alicyclic amine monomer solution. The nanofiltration membrane prepared by said layer by layer assembly method (multi-layer interface reaction polymerization) may have 1-10 layers or cycles. In the preparation process, a single alicyclic acid chloride monomer solution and a single alicyclic amine monomer solution may be used for conventional interfacial polymerization or layer by layer assembly (multi-layer interfacial polymerization) to prepare the polyamide nanofiltration membrane. Alternatively, mixed solutions of two or more kinds of alicyclic acid chloride monomers, and two or more kinds of alicyclic amine monomers may be used for a single interfacial polymerization or layer by layer assembly (multi-layer interface reaction polymerization) to prepare the alicyclic polyamide nanofiltration membrane.

Further, the soaking method may include soak-coating the alicyclic acid chloride solution or the alicyclic amine solution on the porous support membrane or the multi-layer alicyclic polyamide nanofiltration membrane for 2-300 s.

Furthermore, the spin coating method may include spin-coating the alicyclic acid chloride or alicyclic amine on the porous support membrane or the multi-layer alicyclic polyamide nanofiltration membrane for 2-300 s at 50-10,000 rpm.

The present invention uses novel alicyclic acid chloride and alicyclic amine to prepare the fully alicyclic polyamide nanofiltration membrane. Both alicyclic acid chloride monomers structure and nitrogen-contained heterocyclic alicyclic cyclic amine monomers possess with a twisted and non-coplanar structure, which are designed in single interfacial polymerization or layer by layer assembly. Due to the non-coplanar and twisted structures of the both monomers, the resulting nanofiltration membrane prepared has the characteristics of wide distribution of microporous structure, high flux, high monovalent salt permeability (monovalent salt rejection rate <30%) and low divalent salt permeability (divalent salt rejection rate >99%). Therefore, the membrane has an excellent salt separation performance.

The present invention further uses a spin-coating method to uniformly coat the polyamide nanofiltration membrane, so that the monomer solution is evenly distributed inside the micropores and outside the membrane surface, and thus to make the membrane with a low roughness and a uniform thickness. In addition, different spin-coating time and rotation speed could be used to adjust the distribution of the aqueous phase or organic monomers on the microporous membrane and the surface thereof, or the distribution on the surface of the active layer. Thus, the degree of the interfacial polymerization reaction of the aqueous phase monomers and organic phase monomers on the surfaces of the membrane and the active layer could be controlled in order to achieve the control of the morphology, structure, composition and thickness of the nanofiltration membrane during its preparation. Consequently, the prepared alicyclic polyamide nanofiltration membrane would improve the divalent selectivity, monovalent selectivity and flux to overcome "tailor-made" phenomenon associated with membrane materials.

Further, the nanofiltration membrane prepared in the present invention has a smoother membrane with a surface roughness of less than 2 nm, and an ultra-thin film thickness of less than 50 nm.

Based on the technical solutions mentioned above, the present invention can also be improved as following:

Further, the process of the interfacial polymerization or layer by layer assembly, the following steps are further included:

Removing the extra alicyclic acid chloride solution or alicyclic amine solution on the porous support membrane or the multi-layer alicyclic polyamide nanofiltration membrane by the spin coating or soaking method, after coating the alicyclic acid chloride solution or alicyclic amine solution on the porous support membrane or the multi-layer alicyclic polyamide nanofiltration membrane by the soaking or spin-coating method. Wherein the extra alicyclic acid chloride solution or alicyclic amine solution is thrown away and removed at 3,000-10,000 rpm for 2-300 s.

Further, after forming the alicyclic polyamide membrane, the following steps are further included:

Washing the alicyclic polyamide membrane with a low boiling organic solvent for 15-60 s, removing the organic solvent at a rotation speed of 3,000-10,000 rpm for 40-60 s, then providing a heat-treatment to the alicyclic polyamide membrane at 50-90° C. for 1-10 min to obtain the highly selective alicyclic polyamide nanofiltration membrane. Wherein low boiling organic solvent is one or more selected from the group consisting of n-hexane, cyclohexane, cyclopentane, n-heptane, n-octane and iso-Par.

Further, a mass fraction of the alicyclic acid chloride is 0.01-2 wt %, a mass fraction of the alicyclic amine is 0.01-4 wt %.

Further, the alicyclic acid chloride solution includes an alicyclic acid chloride, an organic solvent and an additive. Wherein a mass fraction of the alicyclic acid chloride is 0.01-2 wt %, a mass fraction of the organic solvent is 96-99.98 wt % and a mass fraction of the additive is 0.01-2 wt %. Wherein the organic solvent is one or more selected from the group consisting of n-hexane, cyclohexane, cyclopentane, n-heptane, n-octane and iso-Par.

Wherein the alicyclic amine solution includes an alicyclic amine, an aqueous solvent and an additive. Wherein a mass fraction of the alicyclic amine is 0.01-4 wt %, a mass fraction of the aqueous solvent is 46-99.98 wt % and a mass fraction of the additive is 0.01-50 wt %.

Further, the alicyclic acid chloride solution includes the alicyclic acid chloride and the organic solvent. Wherein the mass fraction of the alicyclic acid chloride is 0.01-2 wt %, and the mass fraction of the organic solvent is 98-99.9 wt %;

Further, the additive is nanoparticles, an organic phenol having a distorted spatial structure, a co-solvent, a hydrophilic additive or a surfactant.

Wherein the nanoparticles are selected from the group consisting of flaky graphene, elongated single-walled carbon nanotube, elongated multi-walled carbon nanotube, organic spherical porous molecule, cage-shaped porous molecule, and wheel-shaped porous molecule.

Wherein the organic phenol having a distorted spatial structure is 5,5',6,6'-tetrahydroxy-3,3,3',3'-tetramethyl-1,1'-spirobiindane or fluorene-9-bisphenol. There's a large spatial structure in the phenolic structure, which may form a more distorted polyester and polyamide block copolymer.

Wherein the co-solvent is selected from the group consisting of acetone, polyol, organophosphorus, dimethylsulfoxide and dimethylformamide.

Wherein the hydrophilic additive is selected from the group consisting of quaternary ammonium salt, alcoholamine, camphorsulfonic acid and polyvinylpyrrolidone (PVP). Wherein the surfactant is one or more selected from the group consisting of PEG 200, PEG 400 and PEG 600.

Further, the alicyclic acid chloride has a structural formula of:

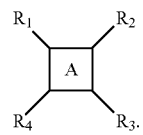

Wherein A is an alicyclic group selecting from the group consisting of four-membered ring, five-membered ring, six-membered ring, seven-membered ring and eight-membered ring. Wherein $R_1$, $R_2$, $R_3$ and $R_4$ are respectively —C(O)Cl group or H, wherein the number of the —C(O)Cl groups is 3-6, wherein two —C(O)Cl groups are ortho or meta to each other.

Wherein the used alicyclic acid chloride includes three or more "—C(O)Cl" groups bonding to the saturated alicyclic hydrocarbon, such as cyclobutene, cyclopentane and cyclohexane. The alicyclic acid chloride used in the present invention can be one or more selected from the group consisting of 1,2,3,4-cyclobutanetetracarboxylic acid chloride, 1,2,4,5-cyclohexanetetracarboxylic acid chloride, 1,3,5-cyclohexane tricarboxylic acid chloride, 1,2,4-cyclopentanetricarboxylic acid chloride, 1,2,3,4-cyclopentanetetracarboxylic acid chloride and 1, 2, 3, 4, 5, 6-cyclohexanecarboxylic acid chloride.

Further, the alicyclic amine has a structural formula of:

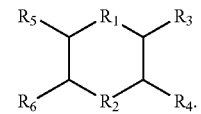

Wherein $R_1$, $R_2$, are respectively —$(CH_2)_n$— or —NH—, wherein n is 1-3; wherein $R_3$, $R_4$, $R_5$, $R_6$ are respectively —$NH_2$ or —$CH_3$; wherein the numbers of the —NH— are 1-2 and the numbers of the —$NH_2$ are 2-4. Wherein when the plurality of —$NH_2$ are on the same side of the ring, both conformations of cis and trans are included.

The alicyclic amine is a nitrogen-containing heterocyclic structure, in which two or more "—$NH_2$ and —NH—" are bonded to the saturated alicyclic hydrocarbon or replace C of the original saturated alicyclic hydrocarbon. Wherein the alicyclic amine monomers can be one or more selected from the group consisting of 2,5-dimethylpiperazine, (1R,2R)-(−)-1,2-diaminocyclohexane, 1,2-diaminocyclohexane, 2,6-dimethylpiperazine, anhydrous piperazine, cyclohexane-1,3-diamine and cyclohexane-1,4-diamine.

Further, the porous support membrane is selected from the group consisting of organic polymer ultrafiltration membrane, hollow fiber ultrafiltration membrane, inorganic ultrafiltration membrane material and organic-inorganic hybrid porous membrane. Wherein the organic polymer ultrafiltration membrane is selected from the group consisting of polysulfone, polyethersulfone, polyacrylonitrile and polyimide; and the inorganic ultrafiltration membrane material is porous alumina or porous ceramic membrane.

The present invention has the following advantages:

In the present invention, a single interfacial polymerization or layer by layer assembly (multi-layer interface reaction polymerization) is carried out by using alicyclic acid chloride and alicyclic amine monomers in a convenient and controllable manner to prepare a highly selective polyamide nanofiltration membrane with low surface roughness. Under certain optimum conditions, the highly selective alicyclic polyamide nanofiltration membrane prepared by the method has a rejection rate of more than 99% and a rejection rate of less than 13% for $Na_2SO_4$ and NaCl, respectively. The fluxes are 89.615 $kg·m^{-2}·h^{-1}·MPa^{-1}$ and 104.339 $kg·m^{-2}·h^{-1}·MPa^{-1}$, respectively, showing an excellent divalent/monovalent selectivity with a 50% increase in flux compared to the traditional interfacial polymerization. In a test using a mixed salt solution having a certain rejection rate, the rejection rate of the semi-aromatic polyamide for $Cl^{-1}$ is about −19%, while the rejection rate of the alicyclic polyamide nanofiltration membrane prepared in the present invention for $Cl^{-1}$ is more than −38%, which indicating latter has an extreme low monovalent rejection rate. Under another optimal condition, removal rates of $CaCl_2$, $MgCl_2$, $MgSO_4$ and $Na_2SO_4$ of the alicyclic polyamide membrane prepared by present invention are all above 99% and the fluxes are between 80-90 $kg·m^{-2}·h^{-1}·MPa^{-1}$, with extremely low membrane surface roughness. The alicyclic polyamide membrane prepared by the present invention is suitable for the fields of water softening, salt separation for zero-liquid discharge of industrial wastewater and biological medicine, etc.

DETAILED DESCRIPTION

The principle and features of the present invention are described below with reference to the accompanying drawings. The illustrated embodiments are only used to explain the present invention, and are not intended to limit the scope of the present invention.

Embodiment 1

Figure 1:
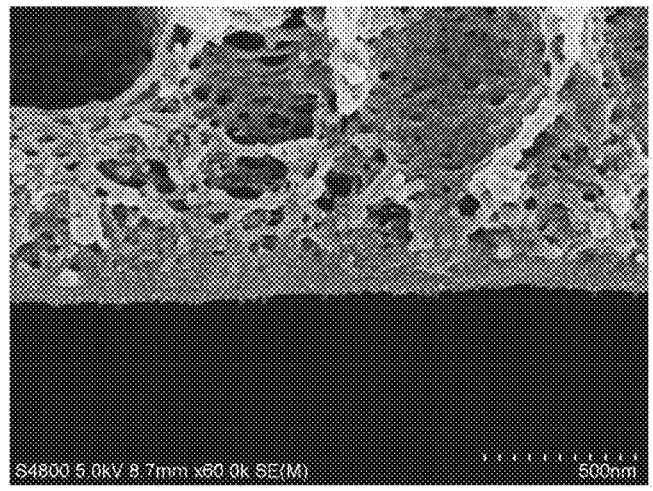
FIG. 1 is a cross-sectional morphology of the alicyclic polyamide nanofiltration membrane prepared in Embodiment 1 of the present invention.
Figure 4:
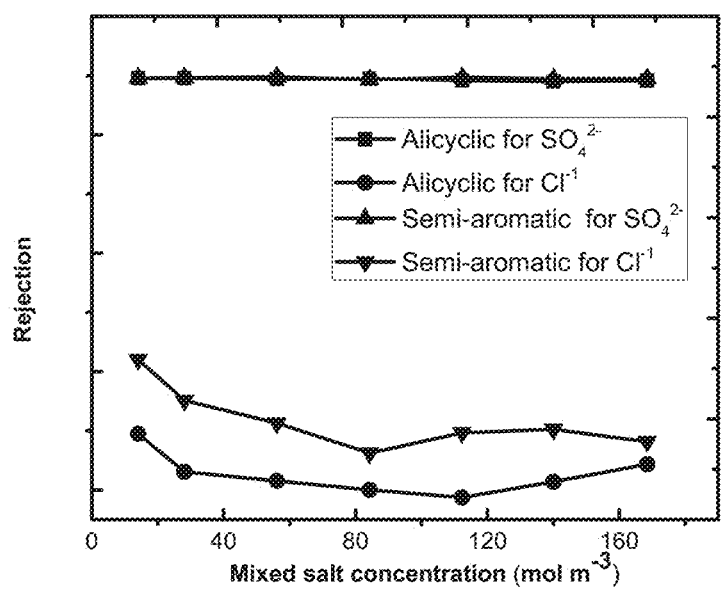
FIG. 4 shows the rejection effects of the alicyclic polyamide nanofiltration membrane prepared in Embodiment 1 of the present invention and rejection effects of the commercial semi-aromatic polyamide nanofiltration membrane for $SO_4^{2-}$ and $Cl^{-1}$ with different concentrations. The test conditions are as follows: salts used are NaCl and $Na_2SO_4$, wherein the $Cl^{-1}$ and $SO_4^{2-}$ are of the same molar concentration, having a total ion molar concentrations of 14.04 $mol·m^{-3}$, 28.08 $mol·m^{-3}$, 56.16 $mol·m^{-3}$, 84.24 $mol·m^{-3}$, 112.32 $mol·m^{-3}$, 140.04 $mol·m^{-3}$, and 168.48 $mol·m^{-3}$, and the test pressure is 1 MPa, the temperature is 25° C., and a flow rate is 7 LPM.

A method of making a highly selective alicyclic polyamide nanofiltration membrane, including the steps of:
(1) Coating a layer of the alicyclic amine solution on a polyethersulfone ultrafiltration membrane by spin-coating method. Specially, allowing the piperazine solution to stand on the membrane for 120 s, throwing away the alicyclic amine solution by the spin-coating method at a rotation speed of 10,000 rpm for 40 s. Wherein the alicyclic amine solution includes a piperazine, an aqueous solvent and an additive. Wherein the additive is acetone and the aqueous phase solvent is water. Wherein a mass fraction of the piperazine is 1.5 wt %, a mass fraction of the acetone is 0.1 wt % and a mass fraction of the water is 98.4 wt %.
(2) Coating a layer of the alicyclic acid chloride solution on the polyethersulfone ultrafiltration membrane coated with the alicyclic amine solution obtained in step (1) by the spin-coating method for interfacial polymerization, with a spin-coating time of 10 s and a rotation speed of 300 rpm. Then throwing away the extra alicyclic acid chloride solution by the spin-coating method at a rotation speed of 10,000 rpm for 40 s. Wherein the alicyclic acid chloride solution includes a 1, 3, 5-cyclohexane tricarboxylic acid chloride and an organic solvent, wherein the organic solvent is n-hexane. A mass fraction of the 1, 3, 5-cyclohexanetricarboxylic acid chloride is 0.1 wt % by weight, and a mass fraction of the organic solvent is 99.9 wt % by weight;
(3) Washing the alicyclic polyamide nanofiltration membrane obtained in step (2) with n-hexane for 15 s, removing the n-hexane at a rotation speed of 3,000 rpm for 40 s, then providing a heat-treatment to the alicyclic polyamide nanofiltration membrane at 50° C. for 60 s to obtain the highly selective alicyclic polyamide nanofiltration membrane, and the cross-section thereof is shown in FIG. 1.
(4) For comparison, a series of equal molar concentration of $Cl^{-1}$ and $SO_4^{2-}$ were used to test the desalination performance of the above alicyclic polyamide membrane and the commercial semi-aromatic polyamide membrane. The comparison curve is shown in FIG. 4.

Embodiment 2

Preparing the alicyclic polyamide nanofiltration membrane by interfacial polymerization method, including the following steps:
(1) Soaking a polyethersulfone ultrafiltration membrane in an alicyclic amine solution, and taking the polyethersulfone ultrafiltration membrane out after 120 s; gas purging the surface of the ultrafiltration membrane to remove the extra alicyclic amine solution. Wherein the alicyclic amine solution is composed of piperazine, additive and aqueous phase solvent. Wherein the additive is acetone, the aqueous phase solvent is water. Wherein a mass fraction of the piperazine is 1.5 wt %, a mass fraction of the acetone is 0.1 wt %, and a mass fraction of the aqueous solvent is 98.4 wt %;
(2) Soaking a 1, 3, 5-cyclohexanetricarboxylic acid chloride solution on the ultrafiltration membrane with the piperazine solution on the surface obtained in the step (1), and taking the ultrafiltration membrane out after 10 s; wherein the organic solvent is n-hexane. Wherein a mass fraction of the 1, 3, 5-cyclohexanetricarboxylic acid chloride is 0.1 wt %, and a mass fraction of organic solvent is 99.9 wt %;
(3) Washing the alicyclic polyamide nanofiltration membrane obtained in step (2) with n-hexane for 15 s, then providing a heat-treatment to the alicyclic polyamide nanofiltration membrane at 50° C. for 60 s, similarly to that of Embodiment 1, to obtain the highly selective alicyclic polyamide nanofiltration membrane.

Figure 2:
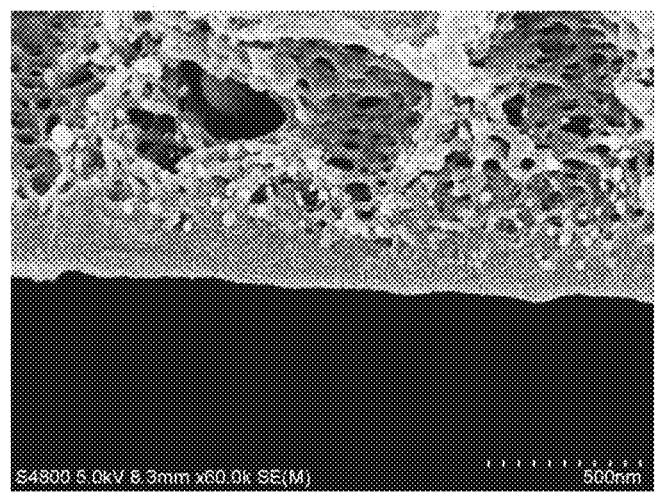
FIG. 2 is a cross-sectional morphology of the alicyclic polyamide nanofiltration membrane Embodiment 2, prepared by the conventional interfacial polymerization-plate frame method.
Figure 3:
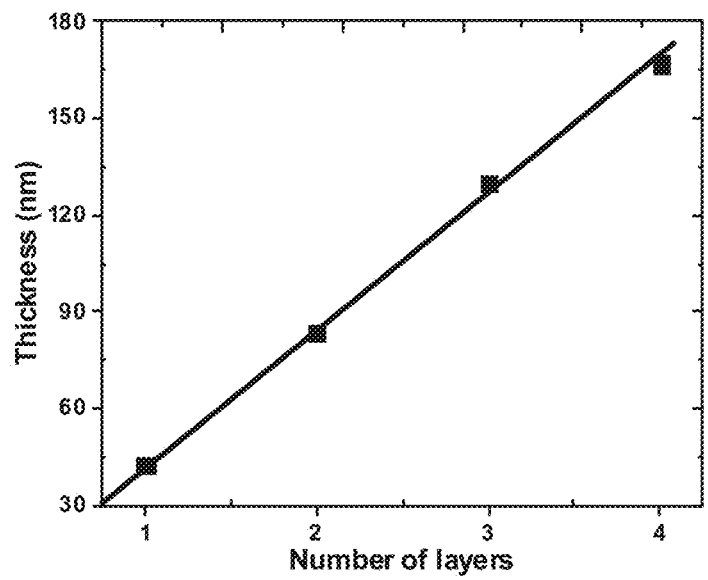
FIG. 3 is the linear variation of the thickness of active layers varying with the number of layers, wherein the test data of thickness are from the ellipsometer.

The cross-sectional view of Embodiment 2 is shown in FIG. 2. It can be seen from FIG. 1 and FIG. 2 that the alicyclic polyamide nanofiltration membrane prepared by the conventional interfacial polymerization-plate frame method has a consistent cross-sectional morphology, while that of the alicyclic polyamide nanofiltration membrane prepared by the spin-coating method is composed of a porous supporting layer and an active layer. The comparison of the desalination performances of the alicyclic polyamide nanofiltration membranes prepared by the conventional interfacial polymerization-plate frame method and the spin-coating method used in Embodiment 1 of the present invention is shown in FIG. 4. Both the rejection rates of $Mg_2SO_4$ by the nanofiltration membrane prepared by the interfacial polymerization spin-coating method and the nanofiltration membrane prepared by the interfacial polymerization-plate frame method remain above 97%, within a polymerization time of 5-30 s. The nanofiltration membrane prepared by the interfacial polymerization-spin-coating method has a 20-40% increase in membrane flux compared to the nanofiltration membrane prepared by the interfacial polymerization-plate frame method, at different interfacial polymerization periods.

The rejection rates of the alicyclic polyamide nanofiltration membrane prepared in Embodiment 1 and the alicyclic polyamide nanofiltration membrane prepared in Embodiment 2 for various types of salts are respectively tested. Wherein the test conditions are as follows: cross-flow test, a single salt concentration of 2,000 ppm, 25° C., 1 MPa, and a flow rate of 7 LPM. The details of the test are shown in Table 1 and Table 2.

TABLE 1

Salt rejection properties of the alicyclic polyamide nanofiltration membrane prepared in Embodiment 1 for salts

|  | $Na_2SO_4$ | $MgSO_4$ | $CaCl_2$ | NaCl | KCl |
|---|---|---|---|---|---|
| Rejection rate (%) | 98.97 ± 0.04 | 97.77 ± 0.07 | 65.15 ± 0.08 | 15.47 ± 0.15 | 18.49 ± 0.39 |
| Membrane Flux ($kg \cdot m^{-2} \cdot h^{-1} \cdot MPa^{-1}$) | 62.41 ± 0.29 | 60.45 ± 0.43 | 53.70 ± 0.42 | 63.55 ± 0.63 | 65.83 ± 0.33 |

TABLE 2

Salt rejection properties of the alicyelic polyamide nanofiltration membrane prepared in Embodiment 2 for salts

|  | $Na_2SO_4$ | $MgSO_4$ | $CaCl_2$ | NaCl | KCl |
|---|---|---|---|---|---|
| Rejection rate (%) | 97.58 ± 0.29 | 96.83 ± 0.32 | 64.17 ± 0.15 | 16.04 ± 0.28 | 19.27 ± 0.42 |
| Membrane Flux ($kg \cdot m^{-2} \cdot h^{-1} \cdot MPa^{-1}$) | 42.8 ± 1.97 | 41.8 ± 1.37 | 36 ± 2.3 | 46.3 ± 1.97 | 47.2 ± 1.52 |

As can be seen from Table 1 and Table 2, rejection abilities of the alicyclic polyamide nanofiltration membrane for different salts are: $Na_2SO_4>MgSO_4>CaCl_2>KCl>NaCl$. Referring to Table 1, the rejection rate for the divalent salt $Na_2SO_4$ is more than 98.97%, while the rejection rate for monovalent salts of NaCl and KCl are respectively 15.47% and 18.49%, showing an excellent selective permeability differences between the monovalent salt and bivalent salt. As to the flux, the fluxes of the alicyclic polyamide membrane to different salts are $KCl>NaCl>Na_2SO_4>MgSO_4>CaCl_2$. Wherein the flux of the monovalent salt is greater than that of the divalent salt due to the different radii of hydration ions of different salt solutions, resulting in osmotic pressure difference on both sides of the diaphragm during infiltration. Comparison of Table 1 and Table 2 shows that the rejection rates of the alicyclic polyamide prepared by the interfacial polymerization spin-coating method and the interfacial polymerization-plate-frame method do not differ much. While the flux of the interfacial polymerization spin-coating method is higher than that of the latter.

Embodiment 3

A method of making a highly selective alicyclic polyamide nanofiltration membrane, including the steps of:
(1) Coating a layer of the alicyclic amine solution on a polyethersulfone ultrafiltration membrane by spin-coating method. Specially, spin-coating a mixed alicyclic amine solution including piperazine and graphene oxide on the membrane at a speed of 500 rpm for 10 s, throwing away the alicyclic amine solution by the spin-coating method at a rotation speed of 9,000 rpm for 30 s. Wherein the alicyclic amine solution is composed of piperazine, aqueous solvent and additive. Wherein a mass fraction of the graphene oxide is 0.05 wt %, a mass fraction of the piperazine is 2 wt % and a mass fraction of the aqueous solvent is 97.95 wt %.
(2) Coating a layer of the alicyclic acid chloride solution on the polyethersulfone ultrafiltration membrane coated with the alicyclic amine solution obtained in step (1) by the spin-coating method for interfacial polymerization. Specially, spin-coating the alicyclic acid chloride solution on the membrane at 500 rpm for 10 s. Then throwing away the extra alicyclic acid chloride solution by the spin-coating method at a rotation speed of 3,000 rpm for 40 s. Wherein the alicyclic acid chloride solution is composed of 1, 2, 4,-cyclopentane tricarboxylic acid chloride and organic solvent, wherein the organic solvent is n-heptane. Wherein a mass fraction of the 1, 2, 4,-cyclopentane tricarboxylic acid chloride is 0.01 wt %, and a mass fraction of the n-heptane is 99.99 wt %.
(3) Washing the alicyclic polyamide nanofiltration membrane obtained in step (2) with n-hexane for 60 s, removing the n-hexane at a rotation speed of 10,000 rpm for 60 s, then providing a heat-treatment to the alicyclic polyamide nanofiltration membrane at 90° C. for 2 min to obtain the highly selective alicyclic polyamide nanofiltration membrane.

The desalination performance of the alicyclic polyamide nanofiltration membrane prepared using the graphene oxide as aqueous solvent in this embodiment is tested. The test conditions are as following: cross-current test, a single salt concentration of 2,000 ppm, 25° C., 1 MPa, and a flow rate of 7 LPM. The details of the test are shown in Table 3.

TABLE 3

Effects of graphene oxide as an aqueous additive on the desalination performance

| | Graphene oxide-based alicyclic polyamide nanofiltration membrane | | alicyclic polyamide nanoflitration membrane | |
|---|---|---|---|---|
| | Rejection rate (%) | Membrane Flux (kg · m$^{-2}$ · h$^{-1}$ · MPa$^{-1}$) | Rejection rate (%) | Membrane Flux (kg · m$^{-2}$ · h$^{-1}$ · MPa$^{-1}$) |
| Na$_2$SO$_4$ | 98.90 | 89.615 | 98.95 | 56.56 |
| NaCl | 12.53 ± 0.58 | 104.34 ± 3.74 | 15.49 ± 0.4 | 67.61 ± 2.5 |

As can be seen from Table 3, the alicyclic polyamide nanofiltration membrane added with graphene oxide shows lower monovalent salt rejection rate and higher flux than that of the non-added alicyclic polyamide nanofiltration membrane, and the rejection rate of divalent salt remains unchanged. In particular, the rejection rates of Na$_2$SO$_4$ and NaCl for graphene oxide-based alicyclic polyamide nanofiltration membranes are 98.90% and 12.53%, respectively; and the fluxes are 89.62 and 104.34 kg·m$^{-2}$·h$^{-1}$·MPa$^{-1}$, respectively. Compared the performance of alicyclic polyamide nanofiltration membrane made without the addition of graphene oxide, the fluxes of monovalent and divalent salts increase by 55% and 58%, respectively. While the monovalent salt rejection rate dropped to 12.53% and the rejection rate of divalent salt remains unchanged.

Embodiment 4

A method of making a highly selective alicyclic polyamide nanofiltration membrane, including the steps of:
(1) Coating a layer of alicyclic amine solution on a polyacrylonitrile ultrafiltration membrane by spin-coating method. Specially, spin-coating an alicyclic amine solution on the membrane at a speed of 50 rpm for 5 s, throwing away the alicyclic amine solution at a rotation speed of 10,000 rpm for 10 s. Wherein the alicyclic amine solution is composed of trans-1, 4-cyclohexanediamine, camphorsulfonic acid and water. Wherein a mass fraction of the trans-1, 4-cyclohexanediamine is 2 wt %, a mass fraction of the camphorsulfonic acid is 0.5 wt % and a mass fraction of the water is 97.5 wt %.
(2) Coating a layer of alicyclic acid chloride solution on the polyacrylonitrile ultrafiltration membrane coated with the alicyclic amine solution obtained in step (1) by spin-coating method for interfacial polymerization. Specially, spin-coating the alicyclic acid chloride solution on the membrane at 500 rpm for 20 s. Then throwing away the extra alicyclic acid chloride solution at a rotation speed of 3,000 rpm for 60 s. Wherein the alicyclic acid chloride solution is composed of 1, 2, 3, 4-cyclobutane tetracarboxylic acid chloride and organic solvent, wherein the organic solvent is n-heptane. Wherein a mass fraction of the 1, 2, 3, 4-cyclobutane tetracarboxylic acid chloride is 0.38 wt %, and a mass fraction of the n-heptane is 99.62 wt %.
(3) Washing the alicyclic polyamide nanofiltration membrane obtained in step (2) with cyclohexane for 120 s, and removing the cyclohexane at a rotation speed of 7,000 rpm for 50 s.
(4) Repeating step (1), step (2) and step (3) to obtain the alicyclic polyamide nanofiltration membrane prepared by the layer by layer assembly method, then providing a heat-treatment to the alicyclic polyamide nanofiltration membrane at 70° C. for 5 min to obtain the highly selective alicyclic polyamide nanofiltration membrane.

The desalination performance, for Na$_2$SO$_4$ and NaCl, of the alicyclic polyamide nanofiltration membrane prepared by four cycles of layer by layer assemblies, using the 1, 2, 3, 4-cyclobutane tetracarboxylic acid chloride as the alicyclic acid chloride solution, in this embodiment is tested. The test conditions are as following: cross-current test, a single salt concentration of 2,000 ppm, 25° C., 1 MPa, and a flow rate of 7 LPM. The details of the test are shown in Table 4.

TABLE 4

Salt rejection properties of the 1,2,3,4-cyclobutane tetracarboxylic acid chloride-based alicyclic polyamide nanofiltration membrane

| | Na$_2$SO$_4$ | | NaCl | |
|---|---|---|---|---|
| | Rejection rate (%) | Membrane Flux (kg · m$^{-2}$ · h$^{-1}$ · MPa$^{-1}$) | Rejection rate (%) | Membrane Flux (kg · m$^{-2}$ · h$^{-1}$ · MPa$^{-1}$) |
| 1 layer | 86.35% | 90.20 | 12.84% | 118.41 |
| 2 layers | 94.36% | 82.93 | 13.70% | 101.84 |
| 3 layers | 96.27% | 75.38 | 14.25% | 91.76 |
| 4 layers | 98.51% | 72.40 | 15.01% | 85.32 |

As can be seen from Table 4, the rejection rates of Na$_2$SO$_4$ and NaCl for the alicyclic polyamide nanofiltration membranes prepared by layer by layer assembly method are 98% and 15%, respectively. And with the increase of the number of layers, the rejection rate of Na$_2$SO$_4$ increases from 86.35% to 98.51%; while the rejection rate of NaCl increases from 12.84% to 15.01%, which remains nearly unchanged. At the same time, with the increase of the number of layers, the flux of the alicyclic polyamide nanofiltration membranes prepared by the layer by layer assembly method decreases as expected. When the layers increases from 1 to 4, the flux for Na$_2$SO$_4$ decreased from 90.20 kg·m$^{-2}$·h$^{-1}$·MPa$^{-1}$ to 72.40·kg·m$^{-2}$·h$^{-1}$·MPa$^{-1}$, while the flux for NaCl decreases from 118.41 kg·m$^{-2}$·h$^{-1}$·MPa$^{-1}$ to 85.32 kg·m$^{-2}$·h$^{-1}$·MPa$^{-1}$. Thus, alicyclic polyamide nanofiltration membranes with different layers show controllable characteristics on the rejection rate and flux, that is, the layer by layer can be assembled to adjust and regulate the performance of the nanofiltration membrane.

Embodiment 5

A method of making a highly selective alicyclic polyamide nanofiltration membrane, including the steps of:
(1) Coating a layer of alicyclic amine solution on a polyethersulfone ultrafiltration membrane by soaking method. Specially, allowing the alicyclic amine solution to stand on the polyethersulfone membrane for 240 s, throwing away the alicyclic amine solution at a rotation speed of 3,000 rpm for 60 s. Wherein the alicyclic amine solution is composed of trans-1, 4-cyclohexanediamine and water. Wherein a mass fraction of the trans-1, 4-cyclohexanediamine is 3 wt %, a mass fraction of the water is 97 wt %.
(2) Coating a layer of alicyclic acid chloride solution on the polyethersulfone ultrafiltration membrane coated with the alicyclic amine solution obtained in step (1) by spin-coating method for interfacial polymerization. Specially, allowing the alicyclic acid chloride solution to stand on the ultrafiltration membrane for 60 s, then throwing away the extra alicyclic acid chloride solution at a rotation speed of 8,000 rpm for 50 s. Wherein the alicyclic acid chloride solution is composed of a 1, 2, 4, 5-cyclohexane tetracarboxylic acid chloride, an organic solvent and an additive, wherein the additive is acetone and the organic solvent is n-heptane. Wherein a mass fraction of the 1, 2, 4, 5-cyclohexane tetracarboxylic acid chloride is 0.12 wt %, a mass fraction of the acetone is 1 wt % and a mass fraction of the n-heptane is 98.88 wt %.
(3) Washing the alicyclic polyamide nanofiltration membrane obtained in step (2) with cyclohexane for 120 s, removing the cyclohexane at a rotation speed of 10,000 rpm for 60 s.
(4) Soaking the washed alicyclic polyamide nanofiltration membrane in a 3 wt % isopropanol-water solution for 3 min, then providing a heat-treatment to the alicyclic polyamide nanofiltration membrane at 90° C. for 5 min to obtain the highly selective alicyclic polyamide nanofiltration membrane.

The rejection rates test of the alicyclic polyamide nanofiltration membrane prepared in this embodiment are performed on various types of salts. The test conditions are as follows: cross-current test, a single salt concentration of 2,000 ppm, 25° C., 1 MPa, and a flow rate of 7 LPM. The details of the test are shown in Table 5.

As can be seen from Table 5, both the flux and rejection rate of the alicyclic polyamide nanofiltration membranes prepared from 1, 2, 4, 5-cyclohexanetetracarboxylic acid chloride and trans-1, 4-cyclohexanediamine are lower than that of the alicyclic polyamide nanofiltration membranes prepared from 1, 3, 5-cyclohexane tricarboxylic acid chloride and piperazine. Specifically, the flux of the nanofiltration membrane for Na$_2$SO$_4$ is 48.69 kg·m$^{-2}$·h$^{-1}$·MPa$^{-1}$, and the rejection rate of Na$_2$SO$_4$ is 95.14%; meanwhile, the flux for NaCl is 45.78±0.73 kg·m$^{-2}$·h$^{-1}$·MPa$^{-1}$ and the rejection rate of NaCl is 20.71%. Thus, it is further demonstrated that invented alicyclic polyamide nanofiltration membranes are highly selective toward the salt separation.

Embodiment 6

A method of making a highly selective alicyclic polyamide nanofiltration membrane, including the steps of:
(1) Coating a layer of alicyclic amine solution on a polyethersulfone ultrafiltration membrane by plate frame method. Specially, soak-coating the alicyclic amine solution to stand on the polyethersulfone membrane for 120 s, removing the extra aqueous phase solution by gas purging or roller squeezing. Wherein the alicyclic amine solution is composed of piperazine and an aqueous phase solution, wherein the aqueous phase solution is water. Wherein a mass fraction of the piperazine is 3.2 wt %, a mass fraction of the water is 96.8 wt %.
(2) Coating a layer of alicyclic acid chloride solution on the polyethersulfone ultrafiltration membrane containing the piperazine on the surface, obtained in step (1) for interfacial polymerization. Specially, coating the alicyclic acid chloride solution on the membrane containing piperazine molecules and standing for reaction for 30 s, then removing the extra alicyclic acid chloride solution. Wherein the alicyclic acid chloride solution is composed of a 1, 2, 3, 4-cyclobutane formic acid chloride and an organic solvent. Wherein a mass fraction of the 1, 2, 3, 4-cyclobutane formic acid chloride is 0.32 wt %. Wherein the organic solvent is n-hexane and a mass fraction of the n-hexane is 99.68 wt %.
(3) Washing the alicyclic polyamide nanofiltration membrane obtained in step (2) with n-hexane for 40 s, then providing a heat-treatment to the alicyclic polyamide nanofiltration membrane at 60° C. for 2 min to obtain the highly selective alicyclic polyamide nanofiltration membrane.

The rejection rates test of the alicyclic polyamide nanofiltration membrane prepared in this embodiment are performed on various types of salts. The test conditions are as following: cross-current test, a single salt concentration of 2,000 ppm, 25° C., 1 MPa, and a flow rate of 7 LPM. The details of the test are shown in Table 6.

TABLE 5

Salt rejection properties of the alicyclic polyamide nanofiltration membrane prepared using 1,2,4,5-cyclohexane tetracarboxylic acid chloride for various types of salts

|  | Na$_2$SO$_4$ | MgSO$_4$ | CaCl$_2$ | NaCl | MgCl$_2$ |
| --- | --- | --- | --- | --- | --- |
| Rejection rate (%) | 95.14 ± 0.23 | 93.4 ± 0.2 | 87.15 ± 0.45 | 20.71 ± 0.76 | 93.37 ± 0.35 |
| Membrane Flux (kg · m$^{-2}$ · h$^{-1}$ · MPa$^{-1}$) | 48.69 ± 0.83 | 46.10 ± 0.42 | 40.18 ± 0.98 | 45.78 ± 0.73 | 43.33 ± 0.74 |

TABLE 6

Salt rejection properties of the alicyclic polyamide nanofiltration membrane prepared by interfacial polymerization method for various types of salts.

| | $Na_2SO_4$ | $MgSO_4$ | $CaCl_2$ | NaCl | $MgCl_2$ |
|---|---|---|---|---|---|
| Rejection rate (%) | 99.1 ± 0.13 | 99.4 ± 0.04 | 99.1 ± 0.11 | 83.3 ± 0.54 | 99.1 ± 0.31 |
| Membrane Flux $(kg \cdot m^{-2} \cdot h^{-1} \cdot MPa^{-1})$ | 86.8 ± 0.61 | 88.3 ± 0.24 | 84.6 ± 0.91 | 96.7 ± 0.30 | 82.9 ± 0.82 |

As can be seen from Table 6, the rejection abilities of the alicyclic polyamide nanofiltration membrane prepared from 1, 2, 3, 4-cyclobutane formic acid chloride for different salts are: $Na_2SO_4$=$MgSO_4$=$CaCl_2$=$MgCl_2$>NaCl. Wherein the rejection rate of the alicyclic polyamide nanofiltration membrane prepared from this kind of acid chloride for all divalent salts is more than 99%, and the rejection rate for the monovalent salt is 83.3%, and the flux is 82.9-96.7 $kg \cdot m^{-2} \cdot h^{-1} \cdot MPa^{-1}$.

Embodiment 7

A method of making a highly selective alicyclic polyamide nanofiltration membrane, including the steps of:

(1) Coating a layer of alicyclic amine solution on a polyimide ultrafiltration membrane by spin-coating method. Specially, allowing an alicyclic amine solution to stand on the membrane for 180 s, throwing away the alicyclic amine solution at a rotation speed of 5,000 rpm for 30 s. Wherein the alicyclic amine solution is composed of reduced graphene oxide, piperazine and water. Wherein a mass fraction of the reduced graphene oxide is 0.1 wt %, a mass fraction of the piperazine is 2 wt %, and a mass fraction of the water is 97.9 wt %.
(2) Coating a layer of the alicyclic acid chloride solution on the polyimide ultrafiltration membrane coated with the alicyclic acid chloride solution obtained in step (1) by spin-coating method for interfacial polymerization. Specially, allowing the alicyclic acid chloride solution to stand on the membrane coated with the alicyclic amine solution for 5 s, throwing away the extra alicyclic acid chloride solution at a rotation speed of 3,000 rpm for 40 s. Wherein the alicyclic acid chloride solution includes a 1, 3, 5-cyclohexane tricarboxylic acid chloride, additive and an organic solvent. Wherein the additive is lutidine and the organic solvent is cyclohexane. Wherein a mass fraction of the 1, 3, 5-cyclohexane tricarboxylic acid chloride is 0.2 wt %, a mass fraction of the lutidine is 1 wt % and a mass fraction of cyclohexane is 98.8 wt %.
(3) Washing the alicyclic polyamide nanofiltration membrane obtained in step (2) with n-hexane for 60 s, removing the n-hexane at a rotation speed of 10,000 rpm for 60 s, then providing a heat-treatment to the alicyclic polyamide nanofiltration membrane at 60° C. for 2 min to obtain the highly selective alicyclic polyamide nanofiltration membrane.
(4) Repeating the above steps to obtain alicyclic polyamide nanofiltration membranes with different layers.

The desalination performance of the alicyclic polyamide nanofiltration membrane prepared, using the reduced graphene oxide as aqueous solvent in this embodiment is tested. The test conditions are as following: cross-current test, a single salt concentration of 2,000 ppm, 25° C., 1 MPa, and a flow rate of 7 LPM. The details of the test are shown in Table 7.

TABLE 7

Rejection properties of the alicyclic polyamide nanofiltration membrane prepared from the reduced graphene oxide for $Na_2SO_4$ and NaCl

| | $Na_2SO_4$ | | NaCl | |
|---|---|---|---|---|
| | Rejection rate (%) | Membrane Flux $(kg \cdot m^{-2} \cdot h^{-1} \cdot MPa^{-1})$ | Rejection rate (%) | Membrane Flux $(kg \cdot m^{-2} \cdot h^{-1} \cdot MPa^{-1})$ |
| 1 layer | 99.03% | 97.23 | 11.15 ± 0.17% | 106.61 ± 2.62 |
| 2 layers | 99.28% | 89.24 | 11.64 ± 0.28% | 101.29 ± 1.75 |
| 3 layers | 99.38% | 81.37 | 12.03 ± 0.91% | 94.82 ± 2.83 |
| 4 layers | 99.71% | 76.38 | 12.48 ± 0.72% | 90 ± 1.39 |

As can be seen from Table 7, as compared to Embodiment 1, the alicyclic polyamide nanofiltration membrane added with the reduced graphene oxide shows a lower monovalent salt rejection rate and a higher flux than the non-added alicyclic polyamide nanofiltration membrane. The rejection rate of the divalent salt remains unchanged. In particular, when the number of layer by layer assembly layers increases from 1 layer to 4 layers, the rejection rate of the alicyclic polyamide nanofiltration membrane for $Na_2SO_4$ does not change much, all of which are maintained at over 99%, whereas the flux decreases from 97.23 $kg \cdot m^{-2} \cdot h^{-1} \cdot MPa^{-1}$ to 76.38 $kg \cdot m^{-2} \cdot h^{-1} \cdot MPa^{-1}$. The rejection rates of NaCl are all below 12%, whereas flux for NaCl decreases from 106.61 $kg \cdot m^{-2} \cdot h^{-1} \cdot MPa^{-1}$ to 90 $kg \cdot m^{-2} \cdot h^{-1} \cdot MPa^{-1}$. Thus, the above results demonstrate that alicyclic polyamide nanofiltration membranes with different layers prepared by layer by layer assembly method exhibit controllable rejection rates and fluxes, that is, the active layer can be assembled to adjust and regulate the performance of the nanofiltration membrane.

Embodiment 8

A method of making a highly-selective alicyclic polyamide nanofiltration membrane, including the steps of:
(1) Coating a layer of alicyclic amine solution on a polyethersulfone ultrafiltration membrane by soaking method. Specially, allowing an alicyclic amine solution to stand on the polyethersulfone membrane for 120 s, removing the extra alicyclic amine solution by gas purging or roller squeezing. Wherein the alicyclic amine solution is composed of trans-1, 4-cyclohexanediamine and water. Wherein a mass fraction of the trans-1, 4-cyclohexanediamine is 2 wt % and a mass fraction of the water is 98 wt %.

(2) Interfacial polymerizing the polyethersulfone ultrafiltration membrane coated with the alicyclic amine solution obtained in step (1) with an alicyclic acid chloride solution.

Specially, allowing the alicyclic acid chloride solution to stand on the ultrafiltration membrane obtained in step (1) for 30 s, then throwing away the extra alicyclic acid chloride solution at a rotation speed of 8,000 rpm for 50 s. Wherein the alicyclic acid chloride solution is composed of a 1, 3, 5-cyclohexane tricarboxylic acid chloride and an organic solvent. Wherein the organic solvent is cyclohexane. Wherein a mass fraction of the 1, 3, 5-cyclohexane tricarboxylic acid chloride is 0.2 wt % and a mass fraction of the cyclohexane is 99.8 wt %.

(3) Washing the alicyclic polyamide nanofiltration membrane obtained in step (2) with n-hexane for 120 s, removing the n-hexane at a rotation speed of 10,000 rpm for 60 s (4) Soaking the washed alicyclic polyamide nanofiltration membrane in a 3 wt % isopropanol—water solution for 3 min, then providing a heat-treatment to the alicyclic polyamide nanofiltration membrane at 70° C. for 5 min to obtain the highly selective alicyclic polyamide nanofiltration membrane.

The rejection rates, for various types of salts, of the alicyclic polyamide nanofiltration membrane prepared in this embodiment are tested. The test conditions are as following: cross-current test, a single salt concentration of 2,000 ppm, 25° C., 1 MPa, and a flow rate of 7 LPM. The details of the test are shown in Table 8.

TABLE 8

Salt rejection properties of the alicyclic polyamide nanofiltration membrane prepared using 1,3,5-cyclohexane tricarboxylic acid chloride for various types of salts.

| | $Na_2SO_4$ | $MgSO_4$ | $CaCl_2$ | NaCl | $MgCl_2$ |
|---|---|---|---|---|---|
| Rejection rate (%) | 98.08 ± 0.01 | 98.34 ± 0.21 | 92.81 ± 0.49 | 29.57 ± 1.68 | 95.61 ± 0.52 |
| Membrane Flux ($kg \cdot m^{-2} \cdot h^{-1} \cdot MPa^{-1}$) | 53.72 ± 1.17 | 55.99 ± 2.28 | 56.69 ± 0.05 | 63.06 ± 0.41 | 55.23 ± 0.96 |

As can be seen from Table 8, as compared to the alicyclic polyamide nanofiltration membrane prepared from 1, 3, 5-cyclohexane tricarboxylic acid chloride and piperazine, the alicyclic polyamide nanofiltration membrane prepared from 1, 3, 5-cyclohexane tricarboxylic acid chloride and trans-1,4-cyclohexanediamine shows a lower monovalent salt rejection rate. The rejection rate of the divalent salt ($CaCl_2$) is higher than that of the alicyclic polyamide nanofiltration membrane prepared from 1, 3, 5-cyclohexane tricarboxylic acid chloride and piperazine. In particular, the flux for $Na_2SO_4$ is 53.72 $kg \cdot m^{-2} \cdot h^{-1} \cdot MPa^{-1}$, and the rejection rate is 98.08%. At the same time, the rejection rate for the NaCl is 29.57%, and the flux thereof is 63.06 $kg \cdot m^{-2} \cdot h^{-1} \cdot MPa^{-1}$. Thus, it shows that the structure of the nanofiltration membrane can be regulated by designing the molecular structures of the monomers polymerized at the interface, so as to selectively separate the divalent salt from the monovalent salt. Compared to the trimesoyl chloride and 1, 3-phenylenediamine having planar structures, the trans-1, 4-cyclohexanediamine and 1, 3, 5-cyclohexane tricarboxylic acid chloride have a twisted conformation. Thus, the nanofiltration membrane prepared therefrom shows a more developed pore structure in the internal structure, which further facilitates $Cl^{-1}$ going through the nanofiltration membrane, to achieve the selective screening of $Cl^{-1}$ and $SO_4^{2-}$.

Embodiment 9

Preparing the alicyclic polyamide nanofiltration membrane by interfacial polymerization method, including the following steps:

(1) Soaking a polysulfone ultrafiltration membrane in an alicyclic amine solution and taking the polysulfone ultrafiltration membrane out after 120 s; gas purging the surface of the ultrafiltration membrane to remove the extra alicyclic amine solution. Wherein the alicyclic amine solution is composed of piperazine and aqueous phase solvent. Wherein the aqueous phase solvent is water. Wherein a mass fraction of the piperazine is 2 wt %, and a mass fraction of the aqueous solvent is 98 wt %;

(2) Soaking a 1, 3, 5-cyclohexanetricarboxylic acid chloride solution on the polysulfone ultrafiltration membrane with the piperazine solution on the surface obtained in the step (1), and taking the ultrafiltration membrane out after 20 s; wherein the organic solvent is iso-Par L. Wherein a mass fraction of the 1, 3, 5-cyclohexanetricarboxylic acid chloride is 0.1 wt %, and a mass fraction of organic solvent is 99.9 wt %;

(3) Providing a heat-treatment to the alicyclic polyamide nanofiltration membrane at 60° C. for 120 s, similarly to that of Embodiment 1, to obtain the highly selective alicyclic polyamide nanofiltration membrane.

TABLE 9

Salt rejection properties of the alicyclic polyamide nanofiltration membrane prepared in Embodiment 9 for salts

| | $Na_2SO_4$ | $MgSO_4$ | $CaCl_2$ | NaCl | KCl |
|---|---|---|---|---|---|
| Rejection rate (%) | 98.27 | 97.15 | 67.45 | 11.57 | 16.38 |
| Water flux ($kg\ m^{-2}\ h^{-1}\ MPa^{-1}$) | 93.21 | 90.25 | 83.76 | 97.59 | 95.25 |

As can be seen from Table 9, rejection abilities of the alicyclic polyamide nanofiltration membrane for different salts are: $Na_2SO_4$>$MgSO_4$>$CaCl_2$)>KCl>NaCl. Specifically, the rejection rate for the divalent salt $Na_2SO_4$ is more than 98.27%, while the rejection rate for monovalent salts of NaCl and KCl are respectively 11.57% and 16.38%, showing an excellent selective permeability differences between the monovalent salt and bivalent salt. As to the flux, the fluxes order of the alicyclic polyamide membrane to different salts are NaCl>KCl>$Na_2SO_4$>$MgSO_4$>$CaCl_2$, wherein the flux of the monovalent salt is greater than that of the divalent salt, due to the different radius of hydration ions of different salt solutions, resulting in osmotic pressure difference on both sides of the diaphragm during infiltration.

The above are only the preferred embodiments of the present invention and are not intended to limit the present invention. Any modifications, equivalent replacements, improvements, etc. within the spirit and principle of the present invention, should be included in the protection scope of the present invention.

What is claimed is:

1. A method of making a highly selective alicyclic polyamide nanofiltration membrane, comprising the steps of:
    alternately and uniformly coating two or more kinds of an alicyclic acid chloride solution and two or more kinds of an alicyclic amine solution on a porous support membrane using a spin coating method for interfacial polymerization, to form layers of the highly selective alicyclic polyamide nanofiltration membrane; wherein
    the spin coating method comprises alternately spin-coating the alicyclic acid chloride solution and alicyclic amine solution on the porous support membrane for 2-300 s at 50-10,000 rpm, to form via multi-layer interface reaction polymerization, a multi-layer alicyclic polyamide nanofiltration membrane.

2. The method of making the highly selective alicyclic polyamide nanofiltration membrane according to claim 1, wherein the interfacial polymerization further comprises the following steps:
    removing extra alicyclic acid chloride solution or extra alicyclic amine solution on the porous support membrane by the spin coating method after an interfacial reaction of the alicyclic acid chloride solution and the alicyclic amine solution, and wherein the extra alicyclic acid chloride solution or the extra alicyclic amine solution is thrown away at 3,000-10,000 rpm for 2-300 s with a soaking solvent.

3. The method of making the highly selective alicyclic polyamide nanofiltration membrane according to claim 1, wherein a concentration of the alicyclic acid chloride solution is 0.01-2 wt%, a concentration of the alicyclic amine solution is 0.01-4 wt%.

4. The method of making the highly selective alicyclic polyamide nanofiltration membrane according to claim 3, wherein the alicyclic acid chloride solution comprises an alicyclic acid chloride, an organic solvent and an additive; a mass fraction of the alicyclic acid chloride is 0.01-2 wt%, a mass fraction of the organic solvent is 96-99.98 wt% and a mass fraction of the additive is 0.01-2 wt%; the organic solvent is one or more selected from the group consisting of n-hexane, cyclohexane, cyclopentane, n-heptane, n-octane and an isoparafin of the ISO-PAR series; and
    the alicyclic amine solution comprises an alicyclic amine, an aqueous solvent and an additive; a mass fraction of the alicyclic amine is 0.01-4 wt%, a mass fraction of the aqueous solvent is 46-99.98 wt% and a mass fraction of the additive is 0.01-50 wt%; and the aqueous solvent is water.

5. The method of making the highly selective alicyclic polyamide nanofiltration membrane according to claim 4, wherein the alicyclic amine comprises a structural formula of:

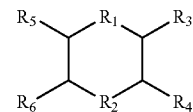

wherein
$R_1$, $R_2$ are respectively —$(CH_2)_n$— or —NH—, n is 1-3; $R_3$, $R_4$, $R_5$, $R_6$ are respectively —$NH_2$ or —$CH_3$; a number of the —NH— is 1-2, and a number of the —$NH_2$ is 2-4; and
when a plurality of —$NH_2$ are on a same side of a ring, both a cis conformation and a trans conformation are included.

6. The method of making the highly selective alicyclic polyamide nanofiltration membrane according to claim 4, wherein the alicyclic acid chloride comprises a structural formula of:

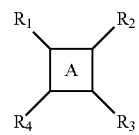

wherein
A is an alicyclic group selected from the group consisting of four-membered ring, five-membered ring, six-membered ring, seven-membered ring and eight-membered ring; and
$R_1$, $R_2$, $R_3$ and $R_4$ are respectively —C(O)Cl group or H, a number of —C(O)Cl group is 3-6, two —C(O)Cl groups are ortho or meta to each other.

7. The method of making the highly selective alicyclic polyamide nanofiltration membrane according to claim 1, wherein the porous support membrane is selected from the group consisting of organic polymer ultrafiltration membrane, hollow fiber ultrafiltration membrane, inorganic ultrafiltration membrane and organic-inorganic hybrid porous membrane;
    the organic polymer ultrafiltration membrane is selected from the group consisting of polysulfone, polyethersulfone, polyacrylonitrile and polyimide; and
    the inorganic ultrafiltration membrane material is a porous alumina or a porous ceramic membrane.

8. The method of making the highly selective alicyclic polyamide nanofiltration membrane according to claim 2, wherein a concentration of the alicyclic acid chloride solution is 0.01-2 wt%, a concentration of the alicyclic amine solution is 0.01-4 wt%.

9. The method of making the highly selective alicyclic polyamide nanofiltration membrane according to claim 8, wherein the alicyclic acid chloride solution comprises an alicyclic acid chloride, an organic solvent and an additive; a mass fraction of the alicyclic acid chloride is 0.01-2 wt%, a mass fraction of the organic solvent is 96-99.98 wt% and a mass fraction of the additive is 0.01-2 wt%; the organic solvent is one or more selected from the group consisting of n-hexane, cyclohexane, cyclopentane, n-heptane, n-octane and an isoparafin of the ISO-PAR series; and
    the alicyclic amine solution comprises an alicyclic amine, an aqueous solvent and an additive; a mass fraction of the alicyclic amine is 0.01-4 wt%, a mass fraction of the aqueous solvent is 46-99.98 wt% and a mass fraction of the additive is 0.01-50 wt%; and
    the aqueous solvent is water.

10. The method of making the highly selective alicyclic polyamide nanofiltration membrane according to claim 1, wherein the multi-layer alicyclic polyamide nanofiltration membrane comprises 10 layers.

11. The method of making the highly selective alicyclic polyamide nanofiltration membrane according to claim 1, wherein the 2-300 s at 50-10,000 rpm comprises at least one of 10 s at 300 rpm and 10 s at 500 rpm.

* * * * *